United States Patent
Kameda et al.

(10) Patent No.: US 10,031,270 B2
(45) Date of Patent: Jul. 24, 2018

(54) POLARIZATION STATE CONVERTING ELEMENT

(71) Applicants: Sumitomo Electric Industries, Ltd., Osaka-shi (JP); Sumitomo Electric Hardmetal Corp., Itami-shi (JP)

(72) Inventors: Shinji Kameda, Itami (JP); Kunimitsu Yajima, Itami (JP); Hiromi Iwamoto, Osaka (JP)

(73) Assignees: Sumitomo Electric Industries, Ltd., Osaka-shi (JP); SUMITOMO ELECTRIC HARDMETAL CORP., Itami-shi (JP)

( * ) Notice: Subject to any disclaimer, the term of this patent is extended or adjusted under 35 U.S.C. 154(b) by 46 days.

(21) Appl. No.: 15/303,410

(22) PCT Filed: Apr. 24, 2015

(86) PCT No.: PCT/JP2015/062488
§ 371 (c)(1),
(2) Date: Oct. 11, 2016

(87) PCT Pub. No.: WO2015/166882
PCT Pub. Date: Nov. 5, 2015

(65) Prior Publication Data
US 2017/0219755 A1    Aug. 3, 2017

(30) Foreign Application Priority Data

Apr. 30, 2014  (JP) .................. 2014-093920

(51) Int. Cl.
*G02B 5/30* (2006.01)
*B23K 26/064* (2014.01)
*G02B 27/28* (2006.01)

(52) U.S. Cl.
CPC .......... *G02B 5/3083* (2013.01); *B23K 26/064* (2015.10); *G02B 27/286* (2013.01)

(58) Field of Classification Search
None
See application file for complete search history.

(56) References Cited

U.S. PATENT DOCUMENTS

| 6,819,646 B1 | 11/2004 | Kitaoka et al. |
| 2005/0058027 A1 | 3/2005 | Kitaoka et al. |
(Continued)

FOREIGN PATENT DOCUMENTS

| JP | 58-016786 A | 1/1983 |
| JP | 01-130121 A | 5/1989 |
(Continued)

OTHER PUBLICATIONS

International Search Report in International Application No. PCT/JP2015/062488, dated Jul. 21, 2015.

*Primary Examiner* — Derek S Chapel
(74) *Attorney, Agent, or Firm* — Venable LLP; Michael A. Sartori; Laura G. Remus

(57) ABSTRACT

Provided is a polarization state converting element including a plurality of waveplates, and a rotation mechanism that rotates the respective waveplates independently of one another around an optical axis. The waveplates are each configured by a substrate made of a material having no optical rotatory property but having birefringence, or are each made of a material having neither optical rotatory property nor birefringence, but having transparency, a function of phase delay depending on polarization being applied on a surface of each waveplate.

6 Claims, 5 Drawing Sheets

(56) References Cited

U.S. PATENT DOCUMENTS

2005/0205538 A1    9/2005   Li
2008/0043328 A1    2/2008   Shim et al.

FOREIGN PATENT DOCUMENTS

| JP | 2000-276766 A | 10/2000 |
|---|---|---|
| JP | 2003-207636 A | 7/2003 |
| JP | 2005-221620 A | 8/2005 |
| JP | 2007-531008 A | 11/2007 |
| JP | 2008-506214 A | 2/2008 |
| JP | 2013-073047 A | 4/2013 |
| JP | 2014-029467 A | 2/2014 |

POLARIZATION STATE CONVERTING ELEMENT

TECHNICAL FIELD

The present invention relates to a polarization state converting element. More particularly, the present invention relates to a polarization state converting element that adjusts a phase shift by azimuth adjustment of waveplates.

BACKGROUND ART

A linearly polarized laser beam is emitted from a laser oscillator in a laser beam machine. When a workpiece (an object to be machined) is machined with using this laser beam, a light absorption of the workpiece largely differs depending on a movement direction of the workpiece, which disables stable laser machining to be performed. Thus, the linearly polarized laser beam emitted from the laser oscillator is converted to circularly polarized light with using a waveplate.

FIG. 4 is a view for describing an optical system of a conventional laser beam machine. The optical system of the laser beam machine is composed of a transmission optical system and a processing optical system. The transmission optical system is an optical system that guides laser light to the processing optical system and, is mainly composed of a circularly polarizing mirror 20, and a plurality of zero shift mirrors (including a metallic reflecting mirror) 21. On the other hand, the processing optical system is an optical system that condenses the laser light on a workpiece surface, and is composed of a plurality of lenses 22. A laser beam 24 emitted from a laser oscillator 23 is linearly polarized light, and is changed to circularly polarized light while being changed in a direction thereof by the circularly polarizing mirror 20. The laser beam 24 changed to the circularly polarized light passes through the plurality of zero shift mirrors 21, and is guided to the processing optical system to be condensed at a desired position of a workpiece 25 by the lenses 22 of this processing optical system. In this case, even if ideal circularly polarized light can be produced by the circularly polarizing mirror 20, passing through the zero shift mirrors 21 and lenses 22 may change a polarization state little by little, which may impair the fine circularly polarized light. If the circularly polarized state has collapsed, decrease in machining accuracy such as decrease in roundness of a hole when the hole is formed, for example, is disadvantageously caused.

Even when a manufacturing error (especially, a phase shift) in optical characteristics of each of the mirrors satisfies a general optical specification, a final polarization state resulting from guiding the laser beam from the transmission optical system to the processing optical system may not attain an ideal circular polarization degree due to complex integration of phase shift errors in the respective mirrors. For example, as to phase shift specifications for the individual mirrors, if the phase shift is ±3° in the circularly polarizing mirror, and ±2° in the zero shift mirrors, and if respective required numbers of the elements are one and six, transmission mirror disposition that cannot reduce the error between the phase shifts of the mirrors causes a shift of at most 15° (3°×1+2°×6).

Against this, measures of making strict the phase shift specification of each of the mirrors have been conventionally taken so that a phase shift specification in the whole transmission optical system satisfies a predetermined standard, which results in a considerable number of defective products. Moreover, the transmission optical system is often customized for each laser beam machine, and thus, it is difficult to realize the phase shift specification applicable to all laser beam machines.

In this manner, there is a limit to making strict the phase shift specification of each of the mirrors, and it is difficult to say that making it strict is a realistic measure in view of a production error.

As a measure to increase machining capacity by eliminating directionality of machining by polarization, there has been proposed a technique of matching a direction of polarization of a laser beam to a direction of machining of a workpiece (refer to Patent Literature 1). In a laser beam machine described in Patent Literature 1, the laser beam is passed through two quarter waveplates, and the laser beam in a linearly polarized state is used for machining. One of the two waveplates is rotatable, and a method is employed in which the one waveplate is rotated so that the direction of the polarization is linked with a motion of the workpiece.

Similarly, as a technique of polarizing a laser beam to be used, which is different from laser machining, there has been an optical pickup apparatus. FIG. 5 is an explanatory view of an optical system of a general optical pickup apparatus. A laser beam 31 emitted from a semiconductor laser 30 is linearly polarized light, and is reflected at a polarization beam splitter 32 and is widened in a collimator 33. The laser beam 31 widened in the collimator 33 is converted to circularly polarized light in a quarter waveplate 34, and passes through an objective lens 35 to reach an optical disk 36. The laser beam 31, which has been subjected to intensity modulation and is reflected by irregularity of the optical disk 36, passes through the quarter waveplate 34 to be converted to linearly polarized light with a polarization plane perpendicular to an outward route. Thereby, the laser beam 31 is transmitted without being reflected at the polarization beam splitter 32, is condensed at a condensing lens 37, and reaches a photo-detector 38 to be converted to an electric signal in the photo-detector 38.

If the above-described optical pickup apparatus is operated for a long time, an oscillation wavelength of a laser oscillator may be shifted due to time degradatin. If the oscillation wavelength of the laser oscillator is shifted, there is a risk that a desired phase shift cannot be obtained at the quarter waveplate 34 inside the pickup, which leads to a decrease in optical energy and a reading error.

Consequently, there has been proposed a technique of using a phase delay plate with an organic thin film having birefringence (refer to Patent Literature 2). In an optical pickup apparatus described in Patent Literature 2, even if an oscillation wavelength of a laser oscillator is changed due to time degradation, the use of the organic thin film having birefringence raises a temperature of the organic thin film, following the change of the oscillation wavelength to thereby change a phase shift, which can suppress influence by time degradation.

CITATION LIST

Patent Literatures

Patent Literature 1: Japanese Unexamined Patent Publication No. S58-16786
Patent Literature 2: Japanese Translation of PCT Publication No. 2008-506214

SUMMARY OF INVENTION

Technical Problem

However, in the laser beam machine described in Patent Literature 1, since the workpiece is machined by linking the rotation of the waveplate with the movement of the workpiece, there is a problem that a machining speed is limited by a weight of the waveplate and a weight of the workpiece. Moreover, while in the laser beam machine using a galvanometer mirror, the galvanometer mirror is shaken (moved) to thereby perform the laser machining, the technique described in Patent Literature 1 cannot be applied to high-speed machining using the above-described galvanometer mirror. In this manner, in the method described in Patent Literature 1, there is a limit to the machining speed of the workpiece, that is, to increase of productivity.

Moreover, while in the optical pickup apparatus described in Patent Literature 2, the organic thin film is used for adjustment of the phase shift, this organic thin film is susceptible to influence by environmental humidity, so that there is a risk that the organic thin film deteriorates early, and the phase shift adjustment is disabled to be performed.

The present invention is achieved in light of the above-described situations, and an objective of the present invention is to provide a polarization state converting element that enables a fine circularly polarized light having a small amplitude ellipticity to be stably obtained.

In the present specification, the "amplitude ellipticity" is obtained by measuring an amplitude with respect to an azimuth angle of the laser light to take (a maximum value/a minimum value) of the amplitude.

Solution to Problem

A polarization state converting element according to one aspect of the present invention includes a plurality of waveplates, and a rotation mechanism that rotates the respective waveplates independently to one another around an optical axis, wherein the waveplates are each configured by a substrate made of a material having no optical rotatory property but having birefringence, or made of a material having neither optical rotatory property nor birefringence, but having transparency, a function of phase delay depending on polarization being applied on a surface of each waveplate.

Advantageous Effects of Invention

According to the above-described invention, fine circularly polarized light having a small amplitude ellipticity can be stably obtained.

DESCRIPTION OF EMBODIMENTS

Description of Embodiments of Present Invention

Figure 1:
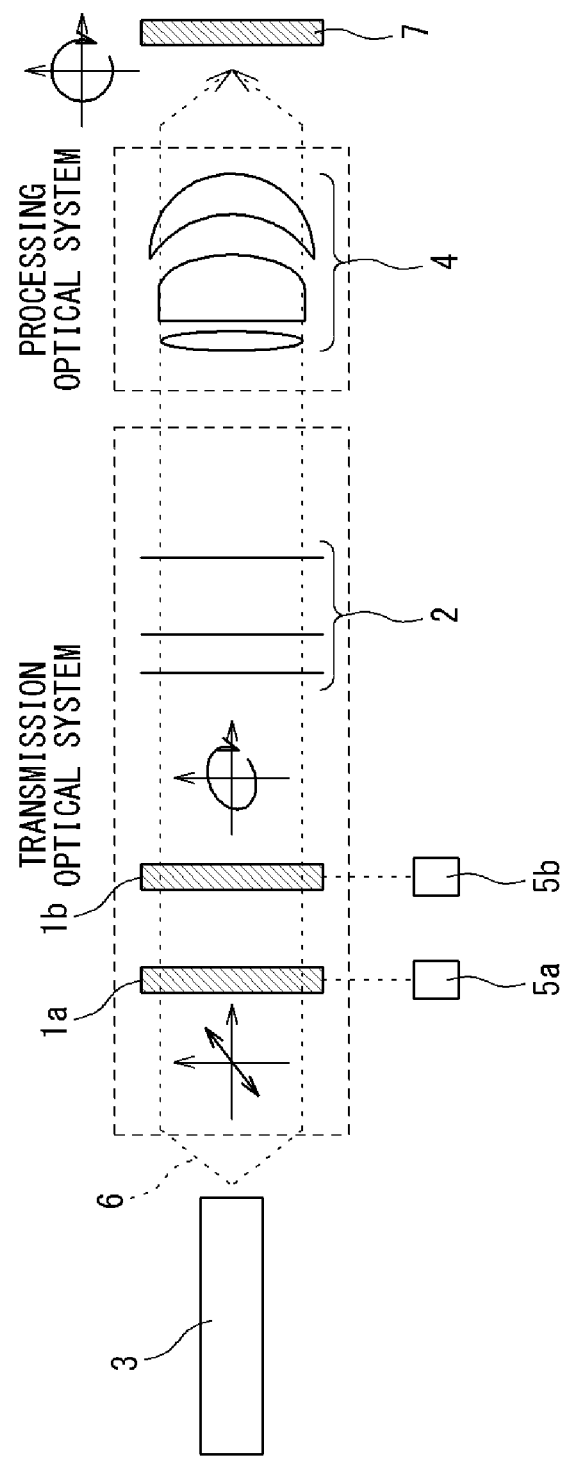
FIG. 1 is an explanatory view of an optical system of a laser beam machine including one embodiment of a polarization state converting element of the present invention.

First, embodiments of the present invention will be listed and described.

A polarization state converting element according to one embodiment of the present invention (1) includes a plurality of waveplates, and a rotation mechanism that rotates the respective waveplates independently to one another around an optical axis, wherein the waveplates are each configured by a substrate made of a material having no optical rotatory property but having birefringence, or made of a material having neither optical rotatory property nor birefringence, but having transparency, a function of phase delay depending on polarization being applied on a surface of each waveplate.

In the polarization state converting element according to the present embodiment, since the respective plurality of waveplates can be rotated independently to one another by the rotation mechanism, calibration work (rotating the waveplates to change azimuth angles thereof) can be performed on the spot to easily adjust a phase shift even if a polarization state of emitted light, which has passed through the waveplates, does not become an intended phase shift. This can stably bring about fine circularly polarized light having a small amplitude ellipticity. Although phase shifts of the waveplates cannot be adjusted at the site, in the polarization state converting element according to the present embodiment, the phase shift as a whole is adjusted by changing the azimuth angles of the waveplates.

For example, even when a transmission optical system is customized in an optical system in a laser beam machine, as long as the polarization state in a final processing system can be measured, the calibration work can be performed on the spot. The polarization state in the processing system can be brought close to desired circularly polarized light by the phase shift adjustment by the rotation of the waveplates to increase machining quality.

Moreover, in an optical pickup apparatus, using the waveplates each configured by only an inorganic matter, the calibration work is periodically performed to address time degradation, which can largely increase durability of the optical pickup apparatus. Further, since the waveplates each configured by only an inorganic matter are enabled to be employed, influence on the phase shift by environmental humidity can be suppressed, so that the optical pickup apparatus can be stably operated.

(2) It is preferable that a total of phase shifts of the plurality of waveplates is 85° or more, and 360° or less. In this case, a controllable region becomes larger, and fine circularly polarized light (the phase shift of the emitted light is within ±5° inclusive, and the amplitude ellipticity is 1.09 or less) can be obtained.

(3) It is preferable that a maximum value of a difference of the phase shifts of the plurality of the waveplates is 0° or more, and 5° or less. In this case, the controllable region becomes larger, and the fine circularly polarized light (the phase shift of the emitted light is within ±5° inclusive, and the amplitude ellipticity is 1.09 or less) can be obtained.

(4) It is preferable that the total of phase shifts of the plurality of waveplates is 90° or more, and that the maximum value of the difference of the phase shifts is 3° or less. In this case, the controllable region becomes larger, and the especially fine circularly polarized light (the phase shift of the emitted light is within ±3° inclusive, and the amplitude ellipticity is 1.05 or less) can be obtained.

(5) The plurality of waveplates can be two ⅛ waveplates. In this case, since the waveplates of the same standard can be used, cost reduction can be achieved.

(6) A method for controlling a polarization state of a laser machining apparatus according to another embodiment of the present invention is a method for controlling a polarization state of a laser machining apparatus including the polarization state converting element according to any one of the above-described (1) to (5), the method including the steps of disposing the polarization state converting element in an optical path of a laser beam emitted from a laser oscillator, the polarization state converting element converting the polarization state of the laser beam from linearly polarized light to circularly polarized light, and rotating the respective plurality of waveplates in the polarization state converting element independently to one another around an optical axis of the laser beam to change respective azimuth angles so that an amplitude ellipticity of the laser beam is 1.05 or less in a state irradiated to a workpiece.

In the method for controlling the polarization state of the laser machining apparatus according to the present embodiment, since the respective plurality of waveplates can be rotated independently to one another by the rotation mechanism, the calibration work (rotating the waveplates to change azimuth angles thereof) can be performed on the spot to easily adjust the phase shift even if the polarization state of the emitted light, which has passed through the waveplates, does not become the intended phase shift. This can stably bring about fine circularly polarized light having a small amplitude ellipticity.

(7) A method for controlling a polarization state of an optical pickup apparatus according to still another embodiment of the present invention is a method for controlling a polarization state of an optical pickup apparatus including the polarization state converting element according to any one of the above-described (1) to (5), the method including the steps of disposing the polarization state converting element in an optical path of a laser beam emitted from a laser oscillator, the polarization state converting element converting the polarization state of the laser beam from linearly polarized light to circularly polarized light, and rotating the respective plurality to waveplates in the polarization state converting element independently of one another around an optical axis of the laser beam to change respective azimuth angles so that an amount of light entering a photo-detector becomes maximum.

In the method for controlling the polarization state of the optical pickup apparatus according to the present embodiment, since the respective plurality of waveplates can be rotated independently to one another by the rotation mechanism, the calibration work (rotating the waveplates to change azimuth angles thereof) can be performed on the spot to easily adjust the phase shift even if the polarization state of the emitted light, which has passed through the waveplates, does not become the intended phase shift. This can stably bring about fine circularly polarized light having a small amplitude ellipticity.

DETAILS OF EMBODIMENTS OF PRESENT INVENTION

Hereinafter, referring to the accompanying drawings, details of the embodiments of a polarized state converting element of the present invention will be described in detail. The present invention is not limited to these illustrations, but all modifications described by claims and in meanings and a scope equivalent to the claims are intended to be included in the present invention.

FIG. 1 is an explanatory view of an optical system of a laser beam machine including a polarization state conversing element according to one embodiment of the present invention.

Figure 4:
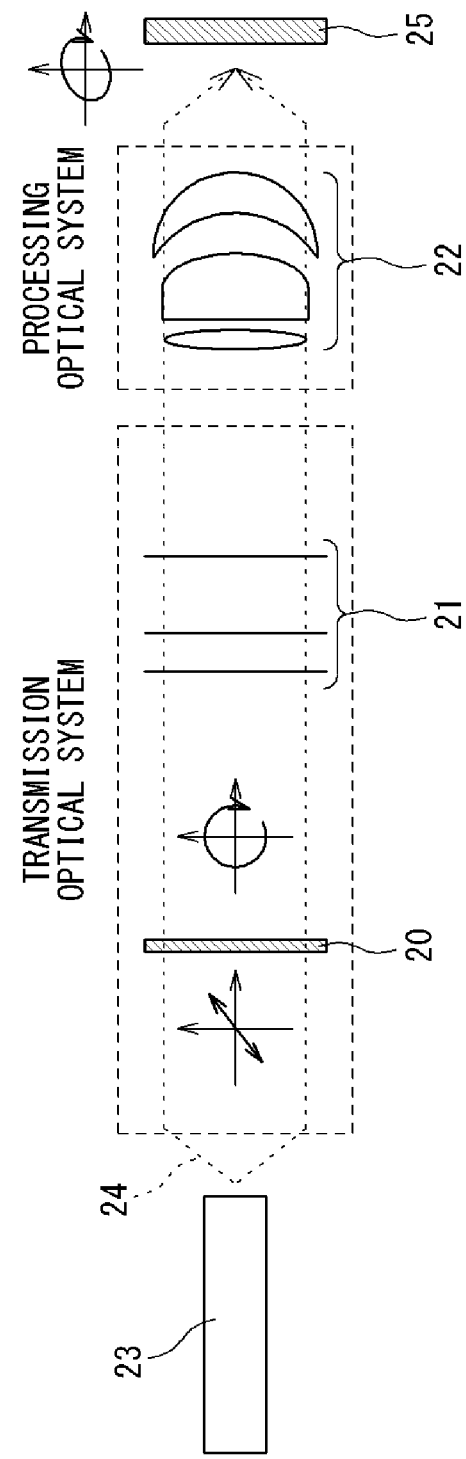
FIG. 4 is an explanatory view of an optical system of a laser beam machine including a conventional polarization state converting element.

The optical system of the laser beam machine shown in FIG. 1 is composed of a transmission optical system and a processing optical system similarly to the optical system of the conventional laser beam machine shown in FIG. 4. However, the optical system of the present embodiment is different in that two rotatable transmission type waveplates are employed in place of the circularly polarizing mirror. While the circularly polarizing mirror has a function of bending a laser beam (changing a direction), and a function of converting a polarization state of the laser beam from linearly polarized light to circularly polarized light, in the optical system of the laser beam machine according to the present embodiment, zero shift mirrors described later have the former function, and the two transmission type waveplates have the latter function.

The transmission optical system is an optical system that guides laser light to the processing optical system, and is mainly composed of two waveplates 1a, 1b, and a plurality of zero shift mirrors (including a metallic reflecting mirror) 2. The waveplates 1a, 1b are disposed on a laser oscillator 3 side of the zero shift mirrors 2. On the other hand, the processing optical system is an optical system that condenses the laser light on a workpiece surface, and is composed of a plurality of lenses 4.

The waveplates 1a, 1b are each configured by a substrate made of a material having no optical rotatory property but having birefringence, or are each configured by a substrate made of a material having neither optical rotatory power nor birefringence but having transparency, to which a function of phase delay depending on polarization is applied on a surface thereof. The application of the function of phase delay can be performed, for example, by forming grooves in a constant direction on the surface of the substrate, or by applying specific coating to a wedge plate.

The material of the waveplates 1a, 1b is not particularly limited in the present invention, but for example, in the case of an infrared laser, ZnSe, Ge, or the like can be used, and ZnSe is coated on the substrate surface, or a minute structure is added, by which each of the waveplates can be obtained. The addition of the minute structure can be performed, for example, by forming a striped pattern with steps on the substrate surface. As a crystal, $LaF_3$ or $CaF_2$ can be used. Moreover, in the case of a visible laser, glass-based materials in general can be employed, and in the case of an ultraviolet laser, the minute structure is added to a surface of a substrate of synthetic quartz or the like, by which the waveplate can be produced.

While the number of the waveplates is not particularly limited in the present embodiment, for example, the number can be two to five. If the number of the waveplates exceeds five, control over them becomes difficult, which is a cause of cost increase. Mechanisms for rotating the plurality of waveplate can be disposed collectively, and it is preferable that as in the present embodiment, the plurality of waveplates can be collectively disposed in one place from a point of view performing save space and achieve high efficiency.

Rotation mechanisms 5a, 5b are joined to the waveplates 1a, 1b, respectively. The rotation mechanisms 5a, 5b are mechanisms to rotate the waveplates 1a, 1b at a predetermined angle, for which a general configuration can be employed as needed. For example, in the case where each of the waveplates is fitted in a central hole of a disk-shaped worm wheel with the central hole, a worm engaged with this worm wheel is connected to an output shaft of a motor through a deceleration mechanism, and the motor can be driven to thereby rotate the waveplate. In this case, the motor, the deceleration mechanism, the worm, and the worm wheel compose the rotation mechanism.

A laser beam 6 emitted from a laser oscillator 3 is linearly polarized light, and is changed to elliptically polarized light in a shape decided by a total phase shift of the two waveplates 1a, 1b. The laser beam 6, which has changed to the elliptically polarized light, further passes through the plurality of zero shift mirrors 2 and is guided to the processing optical system to be condensed at a predetermined position of a workpiece 7 by the lenses 4 of this processing optical system. In the present embodiment, a polarization state of the laser beam 6 on a surface (a surface to be machined) of the workpiece 7 is measured by a rotating analyzer method, a rotating compensator method or the like, and the rotation mechanisms 5a, 5b are driven to adjust respective azimuth angles of the waveplates 1a, 1b so that this polarization state becomes desired circularly polarized light.

The adjustment of the azimuth angles of the two waveplates can be performed independently to each other. The adjustment of each of the azimuth angles can be performed every proper degrees (e.g., every 1°, every 2°, every 3°, . . . ). Once the phase shift of each of the waveplates has been known, a general azimuth angle of the relevant waveplate required for obtaining the desired circularly polarized light can be calculated, based on a method such as a Jones calculation method, for example. The azimuth angle of each of the waveplates is adjusted so as to obtain the calculated, anticipated azimuth angle, and then, each of the waveplates are rotated every proper degrees described before to perform fine adjustment. The respective waveplates 1a, 1b are fixed to the azimuth angles at which an amplitude ellipticity of the emitted light has a desired value (e.g., 1.05) or less.

While next, examples of a polarization state converting element of the present invention will be described, the present invention is not limited to only the examples.

In the following examples, the polarization state of incident light is varied, and it is checked how fine circularly polarized light by the azimuth angle adjustment of both the waveplates can bring about when the incident light passes through the two waveplates.

Example 1

Table 1 shows a result of the polarization adjustment by combination of a 1/16 waveplate (a first waveplate) and a 3/16 waveplate (a second waveplate). In Table 1 and Tables 2 to 4 described later, "d1°" and "d2°" are phase shifts of the first waveplate and the second waveplate, respectively, and "p1°" and "p2°" are azimuth angles of the first waveplate and the second waveplate, respectively.

In the present specification, definition of "positive and negative (±)" of the phase shift and the azimuth angle is as follows.

Figure 2:
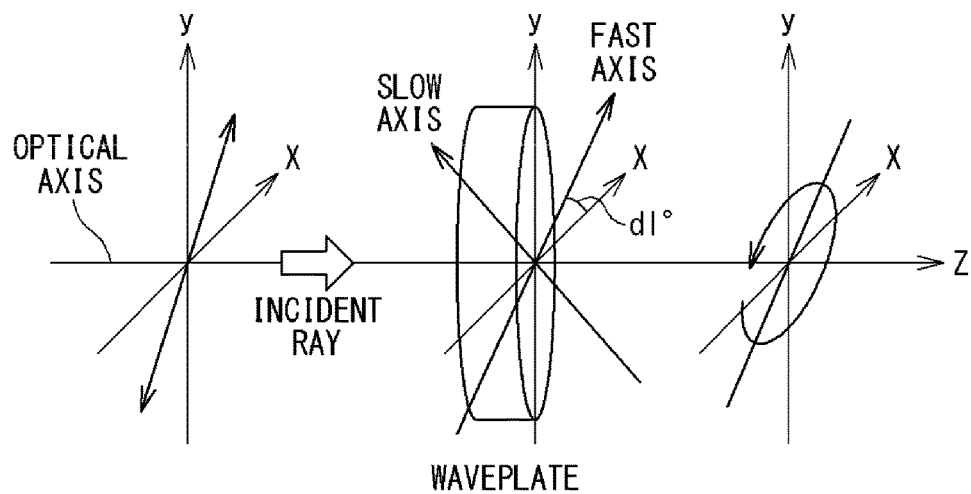
FIG. 2 is a view for describing positive and negative of a phase shift and an azimuth angle.

That is, as shown in FIG. 2, if an optical axis is a z axis, the light advances in a + direction on the z axis (a right direction in FIG. 2), and an x axis and a y axis are disposed in a right-handed system, the incident light has an amplitude of 1 in both an x axis direction and a y axis direction.

An incident light phase shift is defined as +di° if a polarization component in the y axis direction is delayed by di°. In a plane perpendicular to the optical axis in the waveplate, phase delay is given to a linear polarization component in each of the directions, and an axis in a direction where the phase delay is smallest in the incident light and emitted light is referred to as a "fast axis" and an axis in a direction where the phase delay is largest is referred to as a "slow axis". The above-described "fast axis" and "slow axis" are perpendicular to each other.

If the "fast axis" of the waveplate is the x axis and the "slow axis" is the y axis, the azimuth angle is defined as 0°, and if the "fast axis" is inclined at dI° from a + direction on the x axis to a + direction on the y axis, the azimuth angle of the waveplate is defined as +dI°.

TABLE 1

Polarization Adjustment by Combination of 1/16 Waveplate and 3/16 Waveplate

| amplitude ratio of incident light | phase shift of incident light | phase shift d1° | phase shift d2° | azimuth angle p1° | azimuth angle p2° | emitted light amplitude ellipticity |
|---|---|---|---|---|---|---|
| 1 | 0 | 20 | 65 | 0 | 0 | 1.091294 |
| 1 | 30 | 20 | 65 | −48 | 6 | 1.029418 |
| 1 | 45 | 20 | 65 | −87 | 0 | 1.021128 |
| 1 | 50 | 20 | 65 | −87 | 0 | 1.096318 |
| 1 | 55 | 20 | 65 | −87 | 0 | 1.195845 |
| 1 | 90 | 20 | 65 | 39 | −51 | 2.413694 |

In Example 1, as can been understood from Table 1, as the phase shift of the incident light becomes larger, a good solution of the emitted light amplitude ellipticity cannot be found. That is, if the desired amplitude ellipticity is 1.05 or less, the azimuth angles of both the waveplates satisfying the desired amplitude ellipticity exist up to the incident light phase shift of 45° (excluding 0°), while when the incident light phase shift is 50° or more, the azimuth angles of both the waveplates satisfying the desired amplitude ellipticity do not exist. From the foregoing, in the case where the 1/16 waveplate (the first waveplate) and the 3/16 waveplate (the second waveplate) are used in combination, it can be understood that although the polarization adjustment is possible, an adjustment range is limited.

Example 2

Table 2 shows a result of the polarization adjustment using two 1/8 waveplates (the first waveplate and the second waveplate). The azimuth angles of both the waveplates are varied with respect to various polarization states of the incident light to find a minimum value of the amplitude ellipticity of the emitted light, and the azimuth angles of both the waveplates at that time are shown in Table 2.

It can be understood that varying the azimuth angles of the two waveplates brings about fine circularly polarized light even when the phase shift of the incident light is largely shifted from 0° (indicating linearly polarized light). Since with the phase shift of ±3°, the amplitude ellipticity is calculated as 1.053772, it can be determined that if the amplitude ellipticity is 1.05 or less, there is not large influence on the processing.

TABLE 2

Minimum Emitted Light Amplitude Ellipticity with respect to Phase Shift of Incident Light, and Phase Shift and Azimuth Angle of Waveplate at that time

| amplitude ratio of incident light | phase shift of incident light | phase shift d1° | phase shift d2° | azimuth angle p1° | azimuth angle p2° | emitted light amplitude ellipticity |
|---|---|---|---|---|---|---|
| 1 | 0 | 39 | 41 | 0 | 0 | 1.191754 |
| 1 | 30 | 39 | 41 | −24 | 15 | 1.002471 |
| 1 | 45 | 39 | 41 | −33 | 21 | 1.038435 |
| 1 | 60 | 39 | 41 | 36 | −30 | 1.024463 |
| 1 | 75 | 39 | 41 | −45 | 33 | 1.012471 |
| 1 | 90 | 39 | 41 | 39 | −51 | 1.035530 |
| 1 | 120 | 39 | 41 | −54 | 60 | 1.024463 |
| 1 | 135 | 39 | 41 | 57 | −69 | 1.038435 |
| 1 | 150 | 39 | 41 | 66 | −75 | 1.002471 |
| 1 | 180 | 39 | 41 | 0 | 0 | 1.191754 |

From Table 2, it can be understood that when the incident light phase shift is 0° or 180°, the amplitude ellipticity of the emitted light is not below 1.05. The case where the incident light phase shift is 0° or 180° corresponds to a case where the fine linearly polarized incident light is outputted as the fine circularly polarized light, and a total phase shift of the two waveplates in view of the azimuth angles is required to be 90°. It is considered that when the total phase shift of the two waveplates does not satisfy 90° (in the example of FIG. 2, the total phase shift is 80°), the phase shift cannot be widened enough even if the relative azimuth angles of both the waveplates are matched, and that the total phase shift does not become 90, which hinders decrease of the amplitude ellipticity. Accordingly, in order to output the fine circularly polarized light (the amplitude ellipticity is 1.05 or less) with respect to the fine linearly polarized light, the combined waveplates that bring about the total phase shift of the waveplates of 90° or more need to be used. Theoretically, there is no restriction to the total phase shift, such as a restriction that the total phase shift needs to be certain degrees or lower. Accordingly, the total of phase shifts of the plurality of waveplates is 90° or more, and 360° or less from a viewpoint that the fine circularly polarized light (the amplitude ellipticity is 1.05 or less) is outputted with respect to the fine linearly polarized light.

Example 3

Table 3 shows a result of polarization adjustment using two ⅛ waveplates (the first waveplate and the second waveplate). The azimuth angles of both the waveplates are varied with respect to various polarization states of the incident light to find a minimum value of the amplitude ellipticity of the emitted light, and the azimuth angles of both the waveplates at that time are shown in Table 3.

It can be understood that varying the azimuth angles of the two waveplates brings about fine circularly polarized light even when the phase shift of the incident light is largely shifted from 0° (indicating linearly polarized light). Since with the phase shift of ±3°, the amplitude ellipticity is calculated as 1.053772, it can be determined that if the amplitude ellipticity is 1.05 or less, there is not large influence on the processing.

TABLE 3

Minimum Emitted Light Amplitude Ellipticity with respect to Phase Shift of Incident Light, and Phase Shift and Azimuth Angle of Waveplate at that time

| amplitude ratio of incident light | phase shift of incident light | phase shift d1° | phase shift d2° | azimuth angle p1° | azimuth angle p2° | emitted light amplitude ellipticity |
|---|---|---|---|---|---|---|
| 1 | 0 | 48 | 52 | 72 | −84 | 1.020479 |
| 1 | 30 | 48 | 52 | −33 | 18 | 1.040433 |
| 1 | 45 | 48 | 52 | 36 | −24 | 1.027018 |
| 1 | 60 | 48 | 52 | 42 | −27 | 1.038654 |
| 1 | 75 | 48 | 52 | −51 | 30 | 1.014219 |
| 1 | 90 | 48 | 52 | 3 | −87 | 1.072369 |
| 1 | 90 | 49 | 51 | 3 | −87 | 1.035350 |
| 1 | 120 | 48 | 52 | −48 | 63 | 1.038654 |
| 1 | 135 | 48 | 52 | 54 | −66 | 1.027018 |
| 1 | 150 | 48 | 52 | 57 | −72 | 1.040433 |
| 1 | 180 | 48 | 52 | 72 | −84 | 1.020479 |

Although there is a case where the amplitude ellipticity of the emitted light is not below 10.5 only when the incident light phase shift is 90°, the case where the incident light phase shift is 90° corresponds to the case where the fine linearly polarized incident light is outputted as the fine circularly polarized light, and the total phase shift of the two waveplates is required to be 0°. It is considered that when a difference of the phase shifts of the two waveplates is large, the phase shifts cannot be cancelled enough even if a difference between the relative azimuth angles are set large, and that the total phase shift does not become 0°, which hinders decrease of the amplitude ellipticity. Accordingly, in order to output the fine circularly polarized light (the amplitude ellipticity is 1.05 or less) with respect to an arbitrary incident light phase shift, the combined waveplates that bring about the total phase shift of the waveplates of 90° or more, and the difference of the phase shifts of 3° or less (0° is ideal) need to be used. Moreover, from the calculation result in FIG. 3, it can be understood that if the two waveplates that bring about the total phase shift of 180° or more, and the difference of the phase shifts of 3° or less (0° is ideal) are used, the counterclockwise circularly polarized light can be emitted with respect to the incident light as the clockwise circularly polarized light, so that the element that can arbitrarily convert the polarization state can be realized.

As in Example 2, theoretically, there is no restriction to the total phase shift of the waveplates, such as a restriction that the total phase shift needs to be certain degrees or lower. Accordingly, the total of the phase shifts of the plurality of waveplates is 90° or more, and 360° or less from a viewpoint that the fine circularly polarized light (the amplitude ellipticity is 1.05 or less) is outputted with respect to the fine linearly polarized light.

Comparative Example 1

Table 4 shows a case where the polarization adjustment is performed, using only one quarter waveplate. When a sum or a difference of the incident light phase shift and the phase shift of the waveplate is 90°, the azimuth angle that results in the amplitude ellipticity of 1 exists. Otherwise, it can be understood that how much the azimuth angle of the waveplate is changed, there is a limit to the suppression of the amplitude ellipticity. In order to correspond to both complete linearly polarized light and collapsed linearly polarized light, the phase shift of the waveplate needs to be controlled, and the amplitude ellipticity of the emitted light cannot be adjusted with only the one waveplate.

TABLE 4

Polarization Adjustment with one quarter Waveplate

| amplitude ratio of incident light | phase shift of incident light | phase shift d1° | azimuth angle p1° | emitted light amplitude ellipticity |
|---|---|---|---|---|
| 1 | 0 | 90 | 0 | 1 |
| 1 | 10 | 90 | 0 | 1.191754 |
| 1 | 20 | 90 | 0 | 1.428148 |
| 1 | 30 | 90 | 0 | 1.732051 |
| 1 | 0 | 80 | 0 | 1.191754 |
| 1 | 10 | 80 | 0 | 1 |
| 1 | 20 | 80 | 0 | 1.191754 |
| 1 | 30 | 80 | 0 | 1.428148 |
| 1 | 0 | 100 | 0 | 1.191754 |
| 1 | 10 | 100 | 90 | 1 |
| 1 | 20 | 100 | 90 | 1 |
| 1 | 30 | 100 | 90 | 1.428148 |

Other Embodiment

Figure 3:
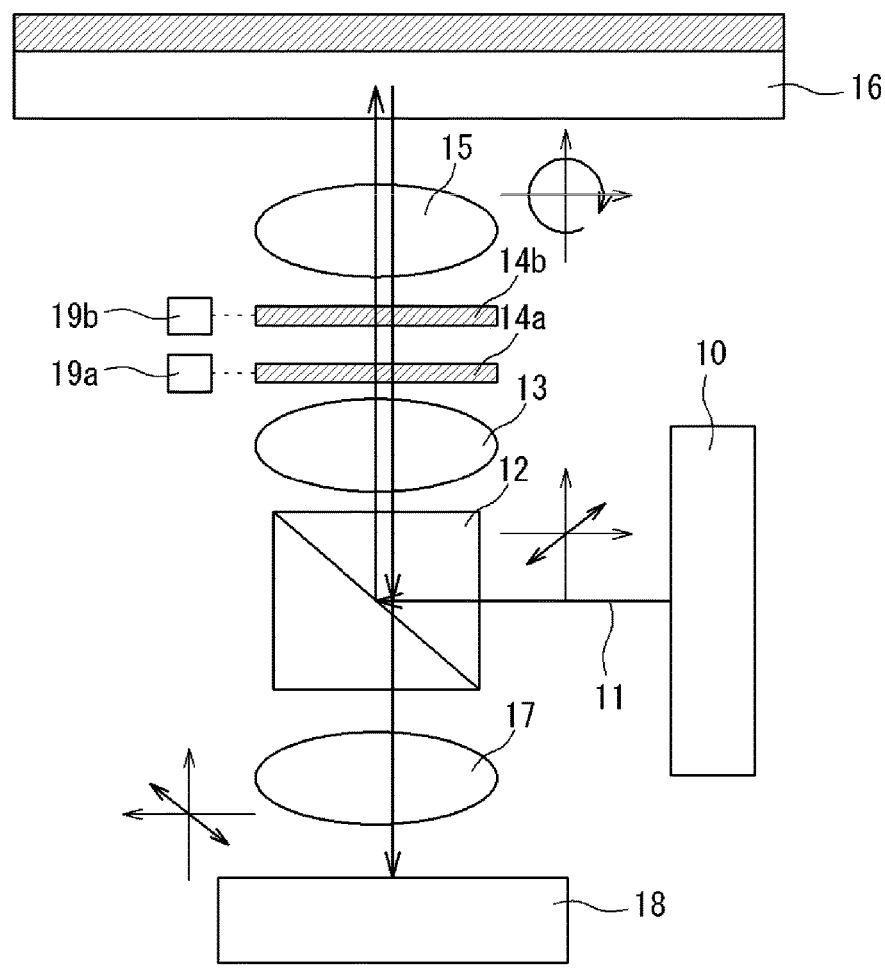
FIG. 3 is an explanatory view of an optical system of an optical pickup apparatus including one embodiment of the polarization state converting element of the present invention.
Figure 5:
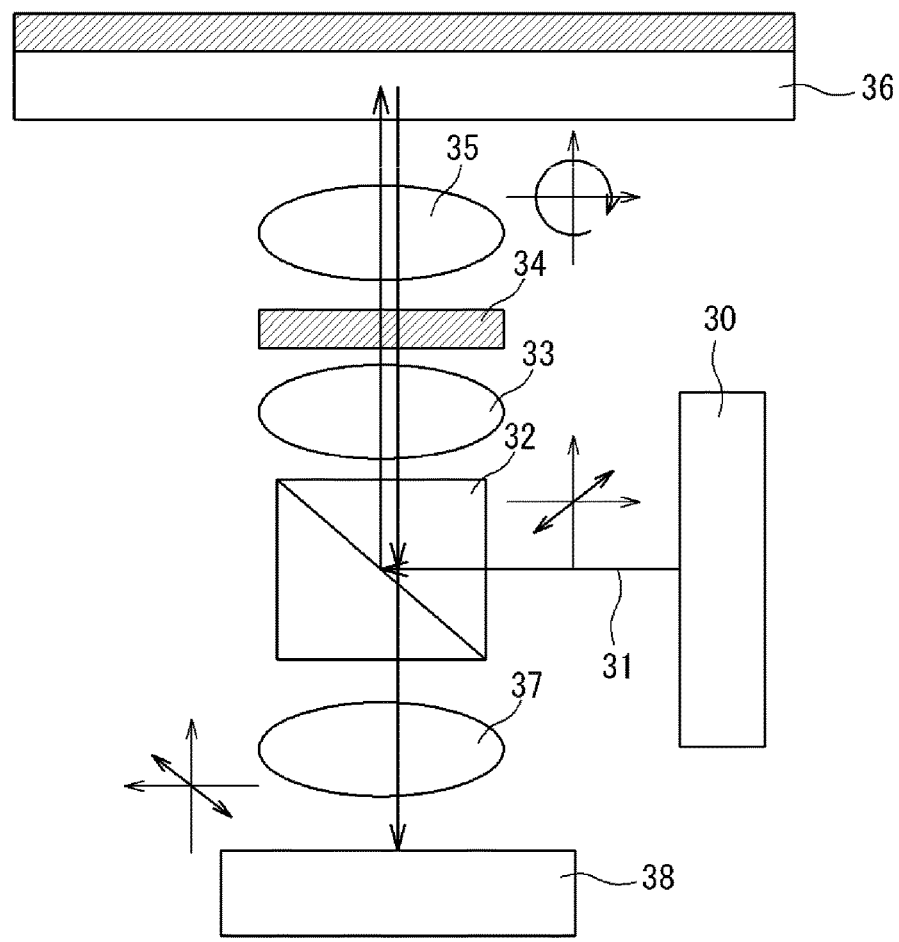
FIG. 5 is an explanatory view of an optical system for general optical pickup.

FIG. 3 is an explanatory view of an optical system of an optical pickup apparatus including one embodiment of the polarization state converting element of the present invention. The optical system of the optical pickup apparatus shown in FIG. 3 is different from the optical system of the conventional general optical pickup apparatus shown in FIG. 5 in that two rotable transmission type waveplates are employed in place of the one quarter waveplate.

In the optical pickup apparatus shown in FIG. 3, a laser beam 11 emitted from a semiconductor laser 10 is linearly polarized light, and is reflected at a polarization beam splitter 12 to be widened in a collimator 13. The laser beam 11 widened in the collimator 13 is converted to circularly polarized light in two transmission type ⅛ waveplates 14a, 14b, and passes through an objective lens 15 to reach an optical disk 16. The laser beam 11, which has been subjected to intensity modulation and is reflected by irregularity of the optical disk 16, passes through the two ⅛ waveplates 14a, 14b to be converted to linearly polarized light with a polarization plane perpendicular to an outward route. Thereby, the laser beam 11 is transmitted without being reflected at the polarization beam splitter 12, is condensed at a condensing lens 17, and reaches a photo-detector 18 to be converted to an electric signal in the photo-detector 18.

The two waveplates 14a, 14b are joined to rotation mechanisms 19a, 19b having a similar function to the function of the rotation mechanisms 5a, 5b described before, and can be rotated independently to each other.

In the present embodiment, the two waveplates 14a, 14b are rotated around an optical axis of the laser beam 11 independently to each other to change respective azimuth angles so that an amount of light entering the photo-detector 18 becomes maximum. This enables the phase shift to be easily adjusted by performing calibration work (rotating the waveplates to change the azimuth angles thereof) on the spot even if the polarization state of the emitted light, which has passed through the waveplates 14a, 14b, does not become the intended phase shift. This can stably bring about the fine circularly polarized light having the small amplitude ellipticity.

Other Modifications

The present invention is not limited to the foregoing embodiments, but various modifications can be made within the scope of claims.

For example, while in the foregoing embodiments, the plurality of waveplates are disposed collectively in one place, the respective waveplates can be disposed at different places.

Moreover, while in the foregoing embodiments, the waveplates are disposed on the laser oscillator side of the zero shift mirrors, the waveplates can also be disposed on the workpiece side of the zero shift mirrors or within the processing optical system, so that the positions of the waveplates are not particularly limited.

REFERENCE SIGNS LIST

1a: WAVEPLATE
1b: WAVEPLATE
2: ZERO SHIFT MIRROR
3: LASER OSCILLATOR
4: LENS
5a: ROTATION MECHANISM
5b: ROTATION MECHANISM
6: LASER BEAM
7: WORKPIECE
10: SEMICONDUCTOR LASER
11: LASER BEAM
12: POLARIZATION BEAM SPLITTER
13: COLLIMATOR
14a: ⅛ WAVEPLATE
14b: ⅛ WAVEPLATE
15: OBJECTIVE LENS
16: OPTICAL DISK
17: CONDENSING LENS
18: PHOTO-DETECTOR
19a: ROTATION MECHANISM
19b: ROTATION MECHANISM
20: CIRCULARLY POLARIZING MIRROR
21: ZERO SHIFT MIRROR
22: LENS
23: LASER OSCILLATOR
24: LASER BEAM
25: WORKPIECE
30: SEMICONDUCTOR LASER
31: LASER BEAM
32: POLARIZATION BEAM SPLITTER
33: COLLIMATOR
34: quarter WAVEPLATE
35: OBJECTIVE LENS
36: OPTICAL DISK
37: CONDENSING LENS
38: PHOTO-DETECTOR

The invention claimed is:

1. A polarization state converting element for a laser machining apparatus, comprising:
two ⅛ waveplates; and
a rotation mechanism that rotates the respective waveplates independently to one another around an optical axis,
wherein the waveplates are each made of a material having neither optical rotatory property nor birefringence, but having transparency, a function of phase delay depending on polarization being applied on a surface of each waveplate, and
wherein the polarization state converting element does not include any other waveplates in addition to the two ⅛ waveplates.

2. The polarization state converting element for a laser machining apparatus according to claim 1, wherein a total of phase shifts of the two ⅛ waveplates is 85° or more, and 360° or less.

3. The polarization state converting element for a laser machining apparatus according to claim 2, wherein the total of phase shifts of the plurality of the two ⅛ waveplates is 90° or more, and the maximum value of the difference of the phase shifts is 3° or less.

4. The polarization state converting element for a laser machining apparatus according to claim 1, wherein a maximum value of a difference of the phase shifts of the the two ⅛ waveplates is 0° or more, and 5° or less.

5. The polarization state converting element for a laser machining apparatus according to claim 4, wherein the total of phase shifts of the two ⅛ waveplates is 90° or more, and the maximum value of the difference of the phase shifts is 3° or less.

6. A method for controlling a polarization state of a laser machining apparatus comprising the polarization state converting element for the laser machining apparatus according to claim 1, the method comprising the steps of:

disposing the polarization state converting element in an optical path of a laser beam emitted from a laser oscillator, the polarization state converting element converting the polarization state of the laser beam from linearly polarized light to circularly polarized light; and rotating the respective two ⅛ waveplates in the polarization state converting element independently to one another around an optical axis of the laser beam to change respective azimuth angles so that an amplitude ellipticity of the laser beam is 1.05 or less in a state irradiated to a workpiece.

* * * * *